H. HUNSICKER.
CLOVER HULLER AND SEPARATOR.
No. 31,389.  Patented Feb. 12, 1861.
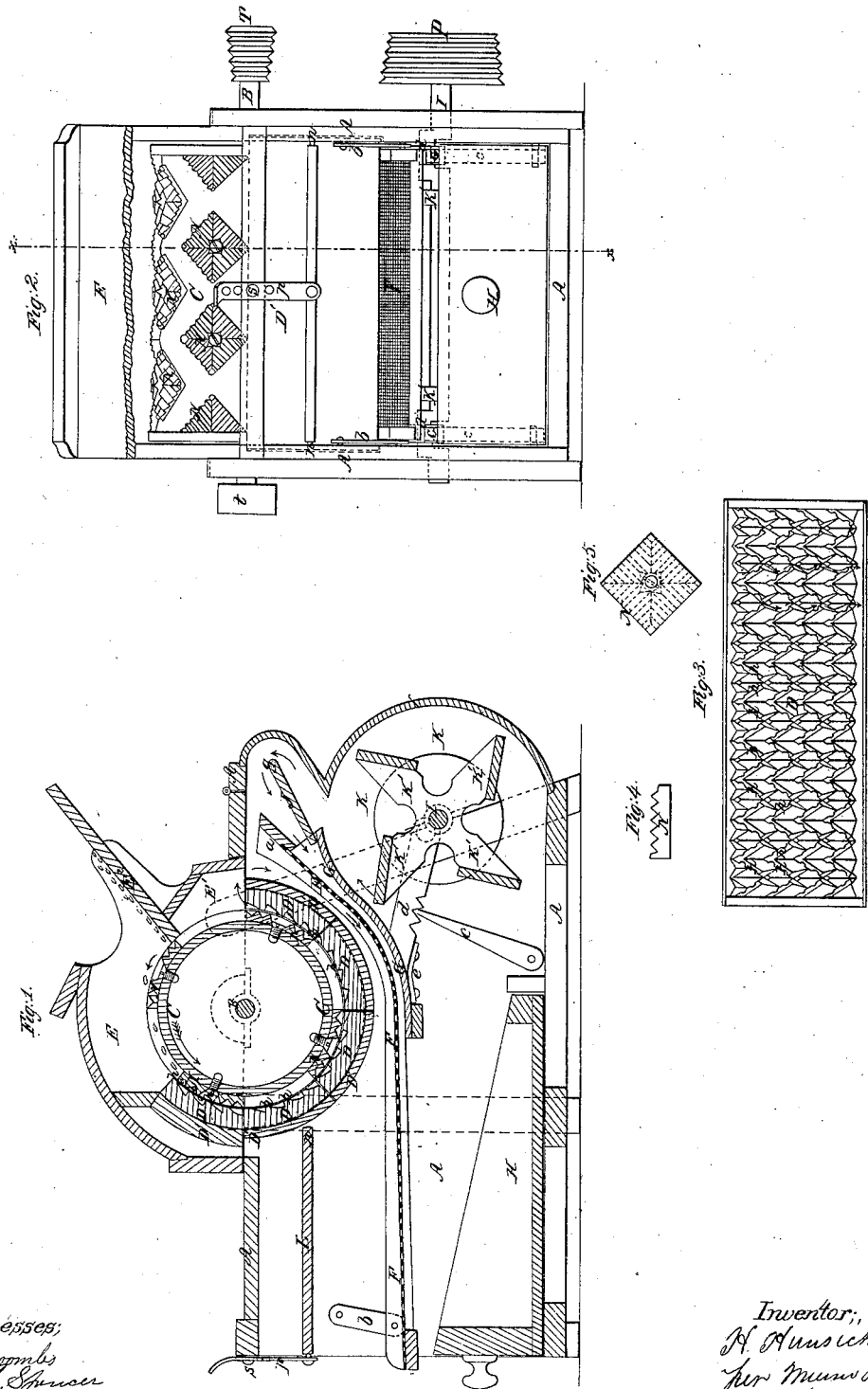

UNITED STATES PATENT OFFICE.

HENRY HUNSICKER, OF LEWISBURG, PENNSYLVANIA.

MACHINE FOR SEPARATING CLOVER SEED, &c.

Specification of Letters Patent No. 31,389, dated February 12, 1861.

*To all whom it may concern:*

Be it known that I, HENRY HUNSICKER, of Lewisburg, in the county of Union and State of Pennsylvania, have invented a new and Improved Clover Huller and Separator; and I do hereby declare that the following is a full, clear, and exact description thereof, reference being had to the accompanying drawings, making a part of this specification, in which—

Figure 1 is a longitudinal section through the improved hulling and separating machine taken in the vertical plane indicated by the red line $x$, $x$, in Fig. 2. Fig. 2 is a view of the discharging end of the machine. This figure represents a portion of the hulling cylinder, part of the hopper-box and concave being broken out for this purpose. Fig. 3 shows the rubbing face of a section of the concave. Fig. 4 is an end view of one of the teeth used on the hulling cylininder. Fig. 5 is a back view of the same.

Similar letters of reference indicate corresponding parts in the several figures.

My invention and improvements in hulling and cleaning clover seed, consist in effecting the discharge from the rear part of the concave, on a vibrating curved screen which is so combined and arranged in relation with the fan box that a blast of air will be caused to act upon the seed, chaff, etc., at a point where it impinges upon the screen in its fall from the concave, as will be hereinafter described, thereby effecting a better separation of the seed from its impurities.

To enable those skilled in the art to make and use my invention, I will proceed to describe its construction and operation.

A, represents the frame of the machine which is closed at both sides, bottom, top, and one end.

B, is the main driving shaft which is also the shaft carrying the cylinder C. Shaft B, has its bearings on each side of the frame A, and on the top of this frame at a point a little to one side of the middle of the length of the frame A, as represented in Fig. 1, of the drawings. Cylinder C, is of cast iron and it carries on its surface a series of rubbing teeth which will be hereinafter described.

Partially surrounding cylinder C, is the concave which is made up of a number of sections of plates D, D, D, which extend transversely across the frame A, and are supported in a bed D′, which like the concave is concentric with the axis of cylinder C. Over the cylinder C, is arranged the hopper box E, which is fitted down snugly on top of frame A. The back part of this box E, contains a portion of the concave which projects above a horizontal plane drawn diametrically through the cylinder C. In the front part of the box E is a compartment or box E′, which forms a communication for the discharge of the seed with its impurities, from the front part of the cylinder to the sieve or screen F, arranged below the cylinder as represented in Fig. 1. The inclined board or shelf E², arranged in box E, extends down to a point very near the surface of cylinder C, and forms a partition for preventing the seed pods, heads, etc., from falling back and into box E′ before they are properly acted upon by the cylinder and concave.

The screen F extends from the point $a$, down and under the concave bed D′, and is thence carried off in an inclined position to the tail end of the machine where the chaff, etc., are finally discharged from it. The front or curved end of screen F, is brought very near to the bed D′ of the concave and its upper end extends nearly to the top of frame A, as will be seen by reference to Fig. 1, so that the seed with its impurities will fall from box E′ on the upper end of this screen and have at first a rapid descent. Underneath this curved part of screen F is a shoe or curved board G, which is secured to the screen, leaving a narrow space at the back of the screen. This shoe G extends upward in a curved form from a point under the axis of the cylinder C, and terminates in a flaring opening near the upper end of the screen F. This curved shoe G, receives the seed from the front end, or curved portion of screen F, and conducts them down to a proper point for their discharge in drawer H. The screen F is hung at its rear or tail end by jointed straps $b$, $b$, which allow it to receive a longitudinal motion; and the front end of this screen F is supported on arms $c$, $c$, which are jointed at their lower ends to the sides of frame A, which also allow a vibratory motion to be given screen F. The screen F receives this vibratory or endwise rocking movement from two pitmen $d$, $d$, which are attached at one of their ends to the bottom of shoe G, at $e$, $e$, by hinge or strap joints; the opposite ends of these pitmen are connected to cranks on fan shaft I, and as the shaft I rotates the cranks give a rapid shaking motion to the screen. The pitmen *d, d*, are slightly inclined from the points *e, e*, to the fan shaft I, and these pitmen each have a number of notches cut on their lower edges into which the upper ends of arms *c, c*, are put, so that by moving the ends of these arms *c, c*, from one notch to the other in pitmen *d, d*, the rising and falling movement of the screen may be increased or diminished as it may be found necessary in the operation of the machine.

J, is a board which is pivoted to the sides of frame A, at *g*, so that its lower end will vibrate. The lower end of this board rests on the upper end of shoe G, and rises and falls at the same time as the shoe and screen. This board J, serves as a partition for conducting the current of air from fan box K, in the direction of the arrows indicated in Fig. 1, so that the blast of air will be conducted down between the shoe G and screen F, entering at the upper end of shoe G. The blast of air will thus be carried through the upper end of the screen and caused to act both above and below the screen as far as the shoe extends, then at the lower termination of the shoe G the currents of air will further assist in blowing the chaff and other impurities out at the tail end of the machine. The drawer H is arranged in the bottom of the machine and extends forward from the rear end of the same to a point under the lower end of shoe G, so that it will receive the seed falling from this shoe besides that which falls from the main body of the screen F. The blast is created by a common fan K', arranged within the box K, which is below and in front of the shoe G.

L is a board which is pivoted at *n, n*, to each side of the frame A, and extends from the back part of bed D' to the rear end of the machine, as shown in Figs. 1 and 2 of the drawings. The rear end of this board L is suspended from the rear end of frame A by a strap *p*, which is fastened to a button *s*. Said strap will allow the rear end of board L, to be raised or depressed so as to increase or diminish the opening between the screen F and this board L. By this adjustment of board L the blast of air from fan box K, may be retarded and partially confined or a free exit may be allowed the air, according as the seed may be damp or dry. This board L, is arranged a suitable distance above the screen F, and its rear end may extend out beyond the end of the frame A. The rear end of this board L, is depressed by lengthening the strap *p*, and when it is thus depressed the currents of air which impinge upon its bottom surface will be deflected downward through the screen F, and submit the "tailings" to a more thorough separation. If the board L, be elevated as represented in Figs. 1, and 2, the currents of air will pass over the tailings and will not be driven downward.

I will now describe the surfaces which rub the seed from the pods and hull the seed. The surface of the concave is made up of angular grooves and elevations. The elevations or ridges *h* are diamond or V shaped and these diamond ridges are disposed in regular order over the concave as represented in Fig. 4. The grooves or channels surrounding these ridges all comunicate with each other so that a free and safe exit is given to the seed as soon as separated from the hull; and the outer edges of the ridges *h* are serrated. The angles of the serrated ridges all point in a direction opposite to the motion of cylinder C. Cylinder C has a surface made up of square teeth N, with right angular ribs *j*, represented in Fig. 2, which ribs, when acting upon the ribs of the concave, produce a drawing or shear cutting action. Teeth N are so arranged on the surface of cylinder C that spiral channels are formed between them which run from end to end of the cylinder. The teeth N, are secured to the surface of cylinder C by screws which pass through the centers of the teeth and their heads are countersunk below the surface of the ribs of the teeth. One screw is sufficient for each tooth, and as the teeth are quadrangular and the ribs on them run in four different ways, these teeth may be reversed when one edge becomes dull by simply loosening the screws sufficient to allow the teeth to be turned around.

The operation of the entire machine is as follows: The cylinder C is rotated in the direction indicated by arrows in Fig. 1 by a continuous band passing over pulley *t*, from some convenient power. The cylinder C carries on its opposite end a small cone pulley T, over which a belt passes which transmits motion to a large cone pulley P on fan shaft I. The machine having been put in motion the clover heads are put in hopper box E on inclined board E², and from this board the heads are received on the cylinder C, which together with the concave D, D, D, rubs out the seed and discharges the seed and impurities mixed with it over the front edge of the concave through box E', directly on the upper end of the screen F, which is kept in constant motion by the pitmen *d, d*, arm *c*, and crank shaft I, as before described, as the seed, etc., fall from box E' they are submitted to a strong blast of air which scatters them over the upper end of the screen. Then as the seed, etc., pass over the upper end of screen F currents of air are forced through the screen and the pure seed which is separated passes through the screen into the shoe G, from whence it is rapidly discharged into drawer H, while the rest of the seed passes down to the less inclined part of the screen where it is submitted to a shaking or sifting action and a strong blast of air which blows off the trash leaving the pure seed to pass through the screen into the drawer H, while the impurities are thrown out from the rear end of the machine.

Having thus described my invention, what I claim as new and desire to secure by Letters Patent, is,

The screen F, as described with its shoe G, and vibrating board J, when the same are constructed and arranged in the relation to discharge box E', concave bed D', and fan box K, herein set forth, for the purposes specified.

HENRY HUNSICKER.

Witnesses:
S. W. MURRAY,
S. D. BATES.